US006415297B1

(12) United States Patent
Leymann et al.

(10) Patent No.: US 6,415,297 B1
(45) Date of Patent: Jul. 2, 2002

(54) PARALLEL DATABASE SUPPORT FOR WORKFLOW MANAGEMENT SYSTEMS

(75) Inventors: Frank Leymann, Aidlingen; Dieter Roller, Schoenaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,425

(22) Filed: Nov. 1, 1999

(30) Foreign Application Priority Data

Nov. 17, 1998 (EP) .......................................... 98121819

(51) Int. Cl.[7] .............................................. G06F 17/30
(52) U.S. Cl. .............................. 707/201; 707/8; 707/10
(58) Field of Search .......................... 707/8, 10, 1, 200, 707/201

(56) References Cited

U.S. PATENT DOCUMENTS

| | | | | |
|---|---|---|---|---|
| 5,555,404 A | * | 9/1996 | Torbjornsen et al. | 707/202 |
| 5,826,239 A | * | 10/1998 | Du et al. | 707/8 |
| 5,878,409 A | * | 3/1999 | Baru et al. | 707/2 |
| 5,960,420 A | * | 9/1999 | Leymann et al. | 707/1 |
| 6,009,405 A | * | 12/1999 | Leymann et al. | 705/9 |
| 6,065,009 A | * | 5/2000 | Leymann et al. | 707/10 |
| 6,073,111 A | * | 6/2000 | Leymann et al. | 705/8 |
| 6,078,982 A | * | 6/2000 | Du et al. | 710/200 |
| 6,122,633 A | * | 9/2000 | Leymann et al. | 707/10 |
| 6,144,955 A | * | 11/2000 | Tsuiki et al. | 707/1 |
| 6,151,583 A | * | 11/2000 | Ohmura et al. | 705/8 |
| 6,237,020 B1 | * | 5/2001 | Leymann et al. | 709/201 |
| 6,278,977 B1 | * | 8/2001 | Agrawal et al. | 705/7 |

OTHER PUBLICATIONS

"Managing business processes an an information resource", by F. Leymann, et al.,, IBM Systems Journal, vol. 33, No. 2, 1994, pp. 326–348.

"Verifikation von Workflows in IBM FlowMark", by D. Roller, 1995, pp. 354–368.
"IBM Flowmark Modeling Workflow", Document No. SH 19–8241, 1994, 1996.
"Project Management Environment", by D.J. Spoon; IBM Technical Disclosure Bulletin, vol. 32, No. 9A, Feb. 1990, pp. 250–254.
"IBM's FlowMark, Object–Oriented Workflow for Mission–Critical Applications", by R.T. Marshak, Workgroup Computing Report, vol. 17, No. 5, pp. 1–13.
"Workflow Management Based on an Object—Oriented Paradigm", by H.A. Inniss, et al., IBM Technical Disclosure Bulletin, vol. 37, No. 3, Mar. 1994, p. 185.
"Business Process Management with FlowMark", by F. Leymann, et al., IEEE 1994, pp. 230–234.
"A meta model to suport the modeling and execution of processes", by Frank Leymann, pp. 287–294.
"Introducing IBM FlowMark for OS/2", Document No. GH 19–8215–01, 1993, 1994, pp. 1–4.
"IBM MQSeries Concepts and Architecture", Version 3.2, Document No. GH 12–6285, 1993, pp. 1–47.
"IBM MQSeries Getting Started with Runtime", Version 3.2.1, Document No. SH 12–6287, pp. 1–41.

* cited by examiner

Primary Examiner—John Breene
Assistant Examiner—Debbie M Le
(74) Attorney, Agent, or Firm—Scully, Scott, Murphy & Presser; Gail H. Zarick, Esq.

(57) ABSTRACT

The invention suggests means for defining a portion of the system-repository of a Workflow-Management-System (WFMS) or a system with comparable functionality to be maintained in a parallel database by a Database-Management-System (DBMS). The WFMS comprises at least one process-model. Moreover, it is suggested that the definition-means for defining, which portions of the system repository is being stored in the parallel database, is comprised in said WFMS's configuration specifications as for instance in said process-model.

9 Claims, 4 Drawing Sheets

PARALLEL DATABASE SUPPORT FOR WORKFLOW MANAGEMENT SYSTEMS

BACKGROUND OF THE INVENTION

1. Technical Field

The present invention relates to the area of Workflow-Management-System (WFMS). More particularly, the invention relates to means for providing improved database support in a Workflow-Management-System (WFMS).

2. Prior Art

A new area of technology with increasing importance is the domain of Workflow-Management-Systems (WFMSs). WFMSs support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development of production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms and documentation for IBM FlowMark is available in every IBM branch.

In F. Leymann: "A meta model to support the modeling and execution of processes", Proceedings of the 11$^{th}$ European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQseries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore, the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

A user typically interacts with the workflow management system via a graphical end user that represents the tasks to be performed by the user as icons. Work for a particular task is started by the user by double-clicking on the appropriate icon which in turn starts the program implementing the activity.

Another area of technology is the technology of database management. Most workflow systems use a relational database to manage build-time information, like their process models, or run-time information, like the state of business processes. WFMSs do increase significantly in complexity and managed data: more and more business processes are being implemented within WFMSs resulting in significant larger numbers of process models to be handled by WFMSs; also the number of cooperating WFMSs, i.e. to the degree of distribution, is undergoing a dramatic increase; etc. To cope with this new challenges the interoperation of the WFMS and the underlying database management system (DBMS) have to be improved. Specific issues are the issues of concurrency, parallelism and availability.

Techniques, such as hotpooling and application server clustering, have been proposed to improve performance and availability. However, no approach has yet been proposed to improve via the interoperation of the WFMSs and the underlying data base management systems (DBMS). Moreover, the state of the art WFMSs are unable t reduce the conflict between the distributed approach of these WFMSs themselves and the central approach of the DBMS. This conflict even becomes more serious with increasing database sizes.

SUMMARY OF THE INVENTION

The present invention is based on the objective to improve the interoperation of WFMSs and the underlying DBMS.

The invention relates to means for defining a portion of the system-repository of a Workflow-Management-System (WFMS) or a system with comparable functionality to be maintained in a database by a Database-Management-System (DBMS). The WFMS comprises one or a multitude of WFMS instances executing on one or a multitude of computer systems. The WFMS comprises at least one process-model. The current teaching suggests defining said portion of said system-repository to be maintained in a parallel database. Moreover it is suggested that the definition-means for doing so is comprised in said WFMS's configuration specifications as for instance in said process-model.

The introduction of parallel database technology within workflow management systems allows the latter to cope with the increasing requirements and expectations. Storing portions of this system repository in parallel databases leads to significant improvements with respect to parallelism, concurrency and availability. Parallel databases allow to work on part of the data at a time, cutting the time required for the operation to a manageable size. Partitioned tables allow a program to work on part of the data at a time, while allowing concurrent access to other programs on other partitions. It becomes possible to put more frequently accessed data on faster devices. More frequently accessed data can be separated from the remainder and can be put in a partition of its own and can use different device type. A single query to a partitioned database can initiate multiple parallel operations. These smaller queries run simultaneously on multiple processors accessing data in parallel. This reduces the elapsed time for a query.

As the definition means are incorporated in the process model very high selectivity is achieved. On the basis of individual process models and on the basis of individual tables the current teaching allows to define whether to parallelize the system repository tables or not.

Especially introduction of inter-partition-parallel-relational-database technology, as introduced according to a further embodiment of the current invention, offers the greatest advantages with respect to parallelism, concurrency and availability. This type of parallel database technology allows for an optimal utilization of parallel processors. In addition it can be easily combined with all other types of parallel processing approaches like multi-tasking and intra-parallel database technology.

According to a further embodiment of the current invention said portion of said system-repository comprises at least one table with a sequence of attributes, said table maintaining one or more records with a sequences of attribute-values. In this environment said definition-means comprise first definition-means for specifying at least one of said attributes as partitioning-key of said table, used by said DBMS to maintain said record in a partition identified by the attribute-value of said partitioning-key for parallel database access. In addition or instead said definition-means comprise second definition-means for specifying at least one additional attribute as partitioning-key of said table.

Based on this additional feature it becomes possible to exploit an already existing table attribute as partitioning key or to introduce an additional attribute for partitioning purposes.

Further advantages are achieved by using the system identification of WFMSs instances as partitioning-key or by using te creation time of said record as partitioning-key.

These attributes result in ideal partitioning keys as the same WFMS system identification or similar time values indicate an inherent relationship between the entries allowing to separate independent activities with respect to database access resulting in optimal parallelism.

According to a further embodiment of the current invention it is suggested to specifying a partitioning-key for one or more tables comprising said process-model and/or for one or more tables comprising execution instances of said process-model and/or for one or more tables comprising an audit-trail of said process-model and/or for one or more tables comprising the workitems related to execution instances of said process-model.

All of these tables are targets of very intensive accesses. Therefore parallelized access capabilities with respect to these tables increase the benefits of the current invention.

The present invention further relates to a Workflow-Management-System (WFMS) or a system with comparable functionality maintaining a portion of the system-repository of said WFMS in a database by a Database-Management-System (DBMS). According to the invention said WFMS comprises one or a multitude of WFMS instances on one or a multitude of computer systems. Said WFMS comprises at least one process-model and maintains said portion of said system-repository in a parallel database.

The advantages mentioned above do apply to this further embodiment as well.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
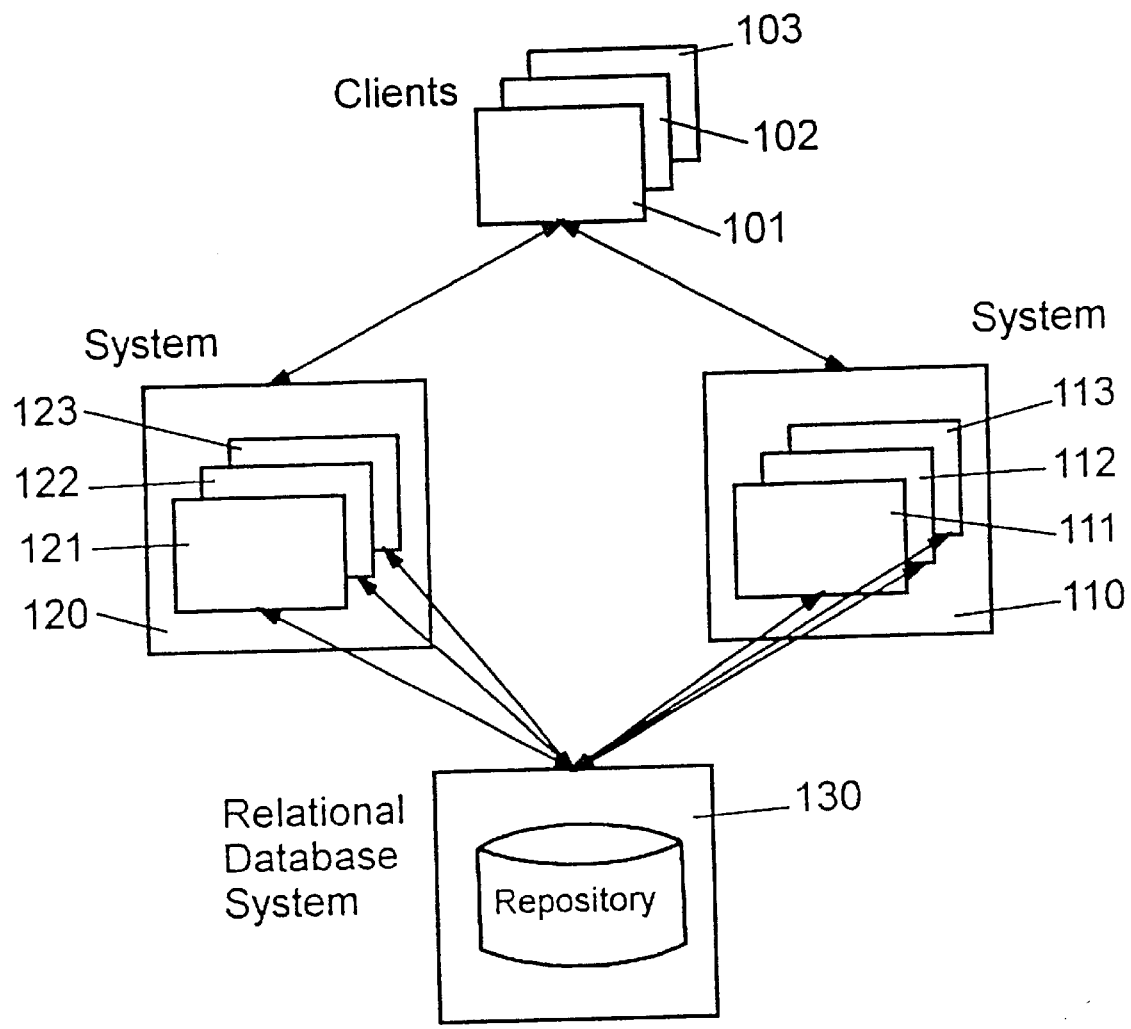
FIG. 1 shows a simplified structure of such a WFMS, comprising a multitude of WFMS instances, and its inter-operation with a DBMS storing the WFMS's system repository in a database.

The present invention is illustrated based on IBM's Flow-Mark workflow management system. Of course any other WFMSs could be used instead. Furthermore the current teaching applies also to any other type of system which offers WFMS functionalities not as a separate WFMS but within some other type of system.

The following is a short outline on the basic concepts of a workflow management system based on IBM's FlowMark WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark. i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

Processes
Activities
Blocks
Control Flows
Connectors
Data Containers
Data Structures
Conditions
Programs
Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next
Which persons are to perform activities and what programs they are to use
Whether any other processes, called subprocesses, are nested in the process Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows fro both, modeling business processes bottom-up and top-down. Activities being a step within a process represents a piece of work that the assigned person can complete by starting a program or another process. In a process model, the following information is associated with each activity:

What conditions must be met before the activity can start
Whether the activity must be started manually by a user or can start automatically
What condition indicates that the activity is complete
Whether control can exit from the activity automatically or the activity must first be confirmed as complete by a user
How much time is allowed for completion of the activity
Who is responsible for completing the activity
Which program or process is used to complete the activity
What data is required as input to the activity and as output from it A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-) process assigned to perform it. The process is invoked when the activity is started. A process activity represents a way to reuse a set of activities that are common to different processes.

Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connectors specify te flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity.

Beside describing the potential flow of control and data between activities a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at a run time to dynamically assign activities to people with suitable attributes.

Process definition includes modeling of activities, control connectors between the activities, input/output container, and data connectors. A process is represented as a directed acyclic graph with the activities as nodes and the control/ data connectors as the edges of the graph. The graph is manipulated via a built-in, event-driven, CUA compliant graphic editor. The data containers are specified as named data structures. These data structures themselves are specified via the DataStructureDefinition facility.

All data structures used as templates for the containers of activities and processes are defined via the Data Structure Definition Facility. Data Structures are names and are defined in terms of elementary data types, such as float, integer, or string and references to existing data structured as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of te process model. The translated version of the model is used as a template when a process instance is created. This allows to make changes to the process model without affecting executing process instances. A process instance is started either via te graphical interface of via the callable process application programming interface. When a process is started, the start activities are located, the proper people are determined, and the activities are posted onto the work list of the selected people as work items. If a user selects the work item, i.e. the activity, the activity is executed and removed from the work list of any other user to whom the activity has been posted.

After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

Typically workflow management system write an audit trail. This audit trail contains a record for each major event, such as start or termination of a process or an activity. The main purpose of the audit trail is to capture the history of the execution of a process instance. Thus an audit trail represents a type of execution protocol of the process models executed by the WFMS. Most workflow management systems store the audit trail directly into a relational database.

In the following we summarize some of the fields to be found in such an audit trail. The WFMSs write such an audit trail record for each encountered event.

Timestamp

Date and time the event took place.

Event

Type of the event that caused the audit trail to be written. Typical events are start of a process, termination of a process, start of an activity, or termination of an activity. Also events of any type occurring during execution of a certain activity are candidates for the audit trail. In such a case the activity itself would generate an audit trail. Thus for current invention it is not important which component is actually generating the event and therefore the audit trail record. This may be done by the WFMS itself or any other program.

User

Identification of the user who performed or initiated the event.

Process Model Name

Name of the process model. Each process model is uniquely identified via this name.

Process Instance Name

Identification of the process instance. Each process is uniquely identified via this name.

Activity Name

Name of the activity. Each activity within a process model is uniquely identified via the name. This field is populated if the event is associated with an activity.

Associated Object Identifier

Uniquely identifies the object associated with the event. This could be the identifier of a work item, of an active instance, or the process instance. This identifier can be used to access the object using the workflow management application programming interface.

User Field

Contains the value of user field. User fields provide a mechanism to store import user data that is associated with a process instance in the audit trail. A typical example is a customer number or the amount of a loan.

MQSeries Workflow is a workflow system that is based on relational database technology and message queuing. The relational database is used to store all data tat needs to be made persistent, such as business processes.

FIG. 1 shows a simplified structure of such a workflow system and it's interoperation with a DBMS. The current specification follows the structure as implemented by MQSeries Workflow though this has to be understood as an example only not limiting the scope of the current invention. As shown, the workflow system is made up of a set of individual systems, the various WFMS instances, to which the clients (101 to 103) are connected. For an end-users this network of cooperating WFMS instances appears as a single logical WFMS. A particular processor (110) or (120) may hold one or more workflow systems (111 to 113) or (121 to 123). Each system consists of a hotpool of one or more stateless servers, that process the different requests, such as starting a process or carrying out an activity. Each server is connected to the relational database management system (130), which manages the workflow system's repository. Incidentally, MQSeries Workflow calls this combination of multiple systems sharing the same database a system group. As already apparent from this system structure the database management system, holding the system repository, may become te bottleneck in terms of concurrency, parallelism and availability as the system repository is the focus of all data traffic; this conflict is due to the distributed approach of that WFMS on one hand and the central approach of DBMS on the other hand.

The workflow system repository not only contains build time information such as process models, organizational data, and characteristics of the programs to be invoked, but also run time information, such as process instances, the audit trail, and the work items assigned to the individual users of the workflow system. Most of the data in the repository is run time information; the size of the build time information can be almost neglected, making the run time information, especially the audit trail, to the main bottleneck. The size of the run time information depends on several factors: the number of process instances, the amount of trail information that is written, and the number of work items that users keep even after having processed them, are the main contributor to the overall size.

The repository consists of a set of tales (at least in case a relational database system is used). The layout of the tables reflect the structure of information that they are holding.

The process information for example is kept in several tables, that reflect the structure of the process meta model. There is for example one table that holds an entry for each process instance and a table that holds an entry for each activity. All constructs, such as activities and processes, are identified via a unique object identifier that is generated by the workflow system. These object identifiers are used to relate the tuples in the individual tables; this is the way that for example the tuples in the activity table are related to the tuples in the process table.

The audit trail on the other hand is a simple table in which the individual entries are written.

All information about a process must be kept at least until the process has finished. However it may be required to keep the information for quite some time; legal obligations sometimes require to keep them for several years. This causes the size of the workflow systems repository to grow quite considerably with the obvious impacts on performance.

These performance impacts can for example be minimized by having the workflow system archive or split off older completed process instances and audit trails. But then these archives must be managed by the workflow system so that the workflow system is capable of answering queries that involves archived information. In case of such a query, the workflow system must issue multiple queries one against the repository and one or more against the archives and then combine the query results into a single query result; thus instead of decreasing the overall activity such approaches would much more lead to a further increase. Besides that the implementation of archiving is not trivial, the performance is generally only tolerable if those queries only occur occasionally.

Thus the current invention seeks to exploit the power of parallel databases to manage even large workflow system repositories, to provide the view of a single logical database and to provide parallel and concurrent accesses to various parts of the system repository of a WFMS.

Advanced relational database management systems, such as IBM's DB2 Universal Database Version 5 (refer for instance to D. Chamberlin, A Complete Guide to DB2 Universal Database, Morgan Kaufmann Publishers, 1998), offer the capability for supporting parallel databases. A parallel database is a database in which multiple actions can take place at the same time.

Parallelism has been available for many years in relational databases. They allowed to have multiple users connected to multiple database providing each of them with the perception of being the only user working with the relational database management system. This is achieved by the standard techniques of time sharing; that means giving each user a certain slice of the processor time to get his or her work done. Each user is assigned one operating system process; that means at most one processor may be busy with performing work for a particular. For differentiation such as database system is called a serial system and parallelism is being introduced by multitasking.

In a parallel system, a database can be split into several separate parts, called partitions or sometimes called nodes. Each table in a database may be split into partitions. Each partition can run on a separate machine; it has its own log and its own set of indexes.

Two kinds of parallelism can be distinguished can be applied to the processing of an SQL statement. Intra-partition parallelism refers to simultaneous processes within a single partition, and inter-partition parallelism refers to simultaneous processes in multiple partitions. Both types of parallelism are orthogonal to each other, i.e. both techniques can be combined and applied in parallel.

Intra-partition parallelism is typically used on symmetric multiprocessor (SMP) machines, in which multiple processors share common memory and disks. Inter-partition parallelism is completely managed by the database management system and does not require any particular action on the user side except that the database management system must be told to exploit intra-partition parallelism.

Inter-partition parallelism works with a set of processors, each of which has its own memory and disks. Nothing is shared between the different processors. This hardware configuration is called a shared nothing system. Some or all of the processors itself may be symmetric multiprocessors that can then exploit intra-partition parallelism, thus intra-partition parallelism and inter-partition parallelism can be combined as orthogonal concepts. A typical machine that implements this architecture is the IBM RD6000 SP2. The different nodes processors communicate with each other via the clusters internal high speed network.

Figure 2:
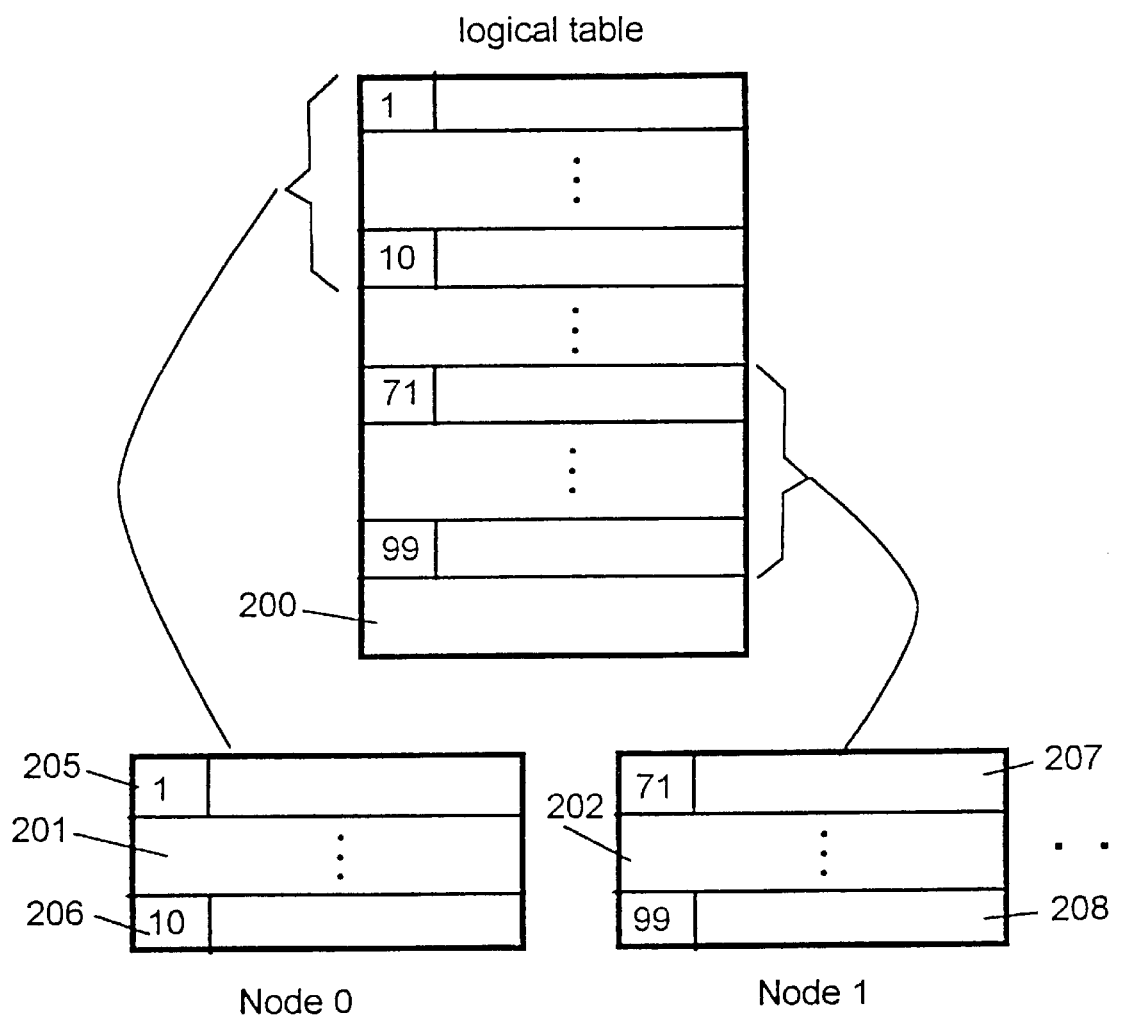
FIG. 2 visualizes a single logical table actually being stored as a set of partitioned tables.

Each of the different partitions, which DB2 UDB calls a node, is assigned a unique identifier, in DB2 UDB an integer starting with 0. Each node is then assigned to the processor that hold the partition. The tables that are assigned to different partitions (called partitioned tabes) must each have a partitioning key that determines how the rows of the tables are distributed among the partitions. The values of the partitioning key are then mapped to the set of partitions using a hash function. This hash function is supplied by the database management system. Such a situation is visualized in FIG. 2. A single logical table (200) actually is stored as a set of partitioned tables (201) an (202). Partitioning keys of the individual records are used to determine which record has to be stored in which partition table. In the example of FIG. 2 records with partitioning keys in the range of −1 to 10 (refer to 205 to 206) are stored in the partition of node 0 (201) while records with partitioning keys in the range of −71 to 99 (refer to 207 to 208) are stored in the partition of node 1 (202). Access to the logical table (200) results in inter-parallel access to the individual partitions (201) to (202).

A database client connects to one of the nodes. This node, the coordinator node, is responsible for all client requests and distributing these requests to the individual nodes. Thus from a user perspective, there is no difference whether an SQL call is processed by a serial database or by a parallel database.

Figure 3:
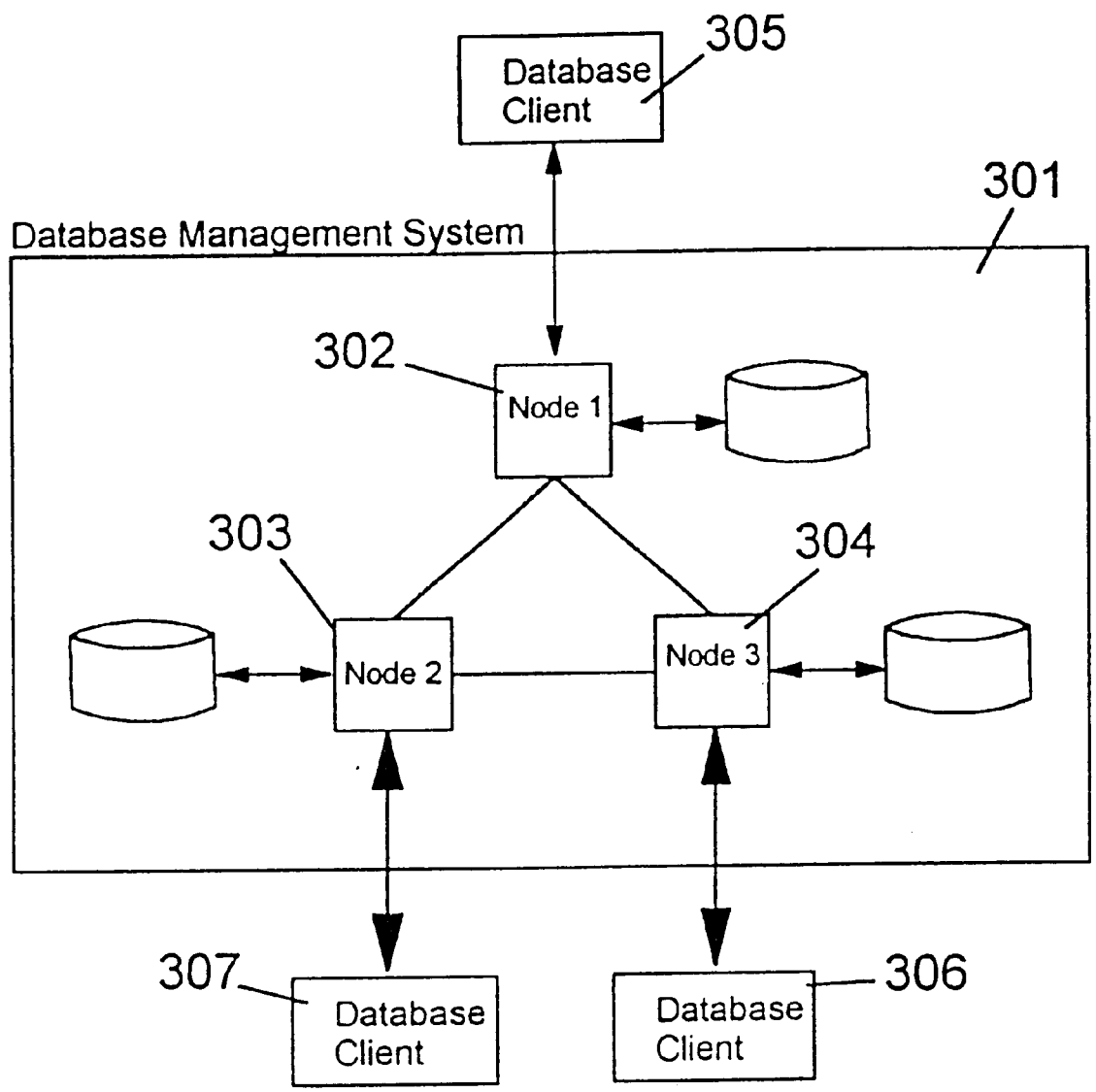
FIG. 3 visualizes the conceptual structure of a database management system using parallel databases offering to various clients the impressions of a single logical database management system.

FIG. 3 shoes the conceptual structure of such a database management system using parallel databases. A single logical database management system (301) offers access for various database clients (305) to (307). The database management system actually is made up of a set of nodes (302 to 304) with corresponding partitioned tables. For instance database client (305) is accessing node 1 (302) as coordinator node establishing to the database client the impression of a single logical database management system.

The purpose of the current teaching is to provide inter-parallelism support of parallel databases to WFMSs (further exploitation of the orthogonal concept of intra-parallelism is possible without any further change of the current teaching).

The current invention suggests to exploit parallel database support by preparing the tables of all the WFMS system repository, i.e. the run-time tables and/or even built-time tables, in such a way that they can be split into multiple parts, which can be handled as partitions by the underlying database management system. This can be achieved by adding columns to all relevant tables and then define those columns to the database management system as the partitioning keys that should be used to split the tables. All tables that form one of the entities, such as processes, need to have this column added.

Using the parallel support of the database management system provides for better performance due to reduced database size, reduced contention, and better exploitation of CPU resources. Best performance results are achieved if a request made by the workflow system relating to one node only is just touching this single node only. The current invention is achieving this goal by including the partitioning key, i.e. the column that was used to split the table into various partitions, into the WHERE clause of the SQL statements.

As already indicated the process instances, the audit trail, and user worklists are ideal candidates for the exploitation of parallel database support. This list is by far not complete: there are certainly other candidates. This depends on the meta model that the workflow system implements. There is also no need to exploit parallel databases for all candidates. It may be just done for the audit trail table, a table that may be heavily used. The current teaching is therefore providing great selectivity for deciding which of the tables are to be parallelized.

The current invention introduces two approaches to define the columns that help to achieve the split: in a first approach internal properties of the tables of WFMSs are being used for the creation of partitions, while in a second approach the creation of partitions is being based on external properties. Internal properties are properties that are available to the workflow system in general relating to definitions of the WFMS as such, like for instance topology definitions; therefore internal properties comprise more global definitions controlling the execution of the multitude of all process models (as far as the definitions have not been overridden by specifications within the individual process models). External properties need extra definition from the user and thus provides greater control over the distribution among the different partitions/nodes; external properties thus comprise all the definitions, which can be included within the individual process model and which are of significance to a specific process model only.

Independently from the particular approach actually chosen a fundamental idea of the current invention is to incorporate the definitions required for partitioning WFMS tables already within the individual process models.

The approach of exploiting internal properties of the tables of WFMSs is based on the table structure as available right now guiding and controlling the WFMS from a global perspective independent from the individual process models executable by the WFMS. This approach is selecting already available table attributes as partitioning keys for parallelization.

Typical internal properties are the creation/start time of a process or the system identifier of the system that created a process. There are others that could also be used; these properties are just prototypical for internal properties. Nevertheless specific advantages are achieve by using exactly this table attributes as partitioning key.

Each process is associated with a creation/start time property, which is written to a table record when the process is created/started. This property allows to divide the tables by time frames, such as days, weeks, months etc. Exploiting a time attribute for partitioning purposes based on the time value is appropriate to partition table records as similar time values indicate an inherent relationship between the entries.

In FIG. 1 the system structure of MQSeries Workflow and it's relationship with underlying database management systems has been visualized. In this structure, each WFMS system is identified by a WFMS system identifier uniquely indicating each WFMS instances. The current teaching suggests to exploit this property to split the tables by system identifier. This property is an ideal property for exploiting parallel databases for multiple reasons:

- The system that creates a process owns that process until the process finishes. Thus there will be no contention on the tables the different systems share; thus parallelization can be maximized. This is particularly attractive for the audit trail, since there will be an own partition for each of the systems.
- Each system know it's name, i.e. is system identifier, without accessing a database and therefor can easily include the name in all accesses to the database; i.e. the WHERE clauses of the SQL statements.
- A particular system could attach to the node that holds all runtime data of that system.

The following new construct for specification of parallel database support based on internal properties is an illustration of how the support for parallel databases could potentially expressed in MQSeries Workflow's Flow Definition Language.

```
SYSTEM_GROUP Stuggart
    PARALLEL_DATABASE_SUPPORT
        AUDIT_TRAIL      SYSTEM_ID
        PROCESSES        CREATION_TIME
END Stuggart
```

It defines for system group "Stuggart", i.e. a collection of WFMS system instances combined to and addressable as a group, that some tables should be split and defines for two areas how that should be done. The second line shows a definition construct, which indicates to the WFSM that the following tables have to be split into partitions. The third and fourth line reflect the definition constructs specifying in the first field the table which is to be partitioned (i.e. to be parallelized); the second field defines the attribute the value of which is to be used as partitioning key by the WFMS as well as by the DBMS. With respect to the current example the audit trail (AUDIT_TRAIL) is split (i.e. partitioned) by system identification (SYSTEM_ID), that means the workflow system maintains and uses the WFMS system identification column in the audit trail. The tables that hold the process information (PROCESSES) are split by creation time (CREATION_TIME) of the processes. Thus the workflow system must maintain and use a column in each of the tables that hold the creation time. Due to the global nature of the specifications of internal properties these definitions are controlling the corresponding tables of all process models if not overridden with new specifications within the individual process models.

Based on the current teaching and with reference to above example the WFMS would include the partitioning key within every WHERE clause of the SQL statements accessing the databases; the SELECT statement for an audit trail access would therefore be of the following form:

SELECT<attribute_list>FROM AUDIT_TRAIL WHERE SYSTEM_ID='SYS1'

Such an approach results in significant performance improvements as the optimizer of the DBMS are enabled to direct the database access to the addressed system with system identification "SYS1" only.

External properties are specifically defined by the user and associated with constructs within the meta model of the process model. In case of external properties new definition constructs instruct the WFMS and the DBMS to introduce further attributes within a table serving the purpose of a partitioning key. Moreover, in a further extension of the teaching, within the process model certain values may be assigning as partitioning key identifying in which part of the table appropriate record instance should be stored. The workflow system manages then a particular column within the appropriate tables.

External properties override due to their local significance (i.e. being only of importance for the process model incorporating the specifications) corresponding specifications of internal properties (being of global nature).

The following table illustrates how this support for parallel databases could potentially expressed in MQSeries Workflow's Flow Definition Language.

```
1     PROCESS Loan
2         PARALLEL_DATABASE_SUPPORT
3             AUDIT_TRAIL     NODE1
4             PROCESSES       NQDE2
5     END LoanProcess
6     PROCESS TravelExpense
7         PARALLEL_DATABASE_SUPPORT
8             AUDIT_TRAIL     NODE3
9             PROCESSES       NODE3
10    END TravelExpense
```

With respect to the above example the specification reflect the definition of following aspects:

- It defines that splitting is defined by the user using an external property (lines 3 and 4). Thus the workflow system introduces and maintains a particular column (similar to the system identification column), i.e. a particular table attribute, in the audit trail table and the process instances tables for partitioning purposes. The values of the new attribute will used as partitioning key. If this example is viewed as an extension to the example given with respect to the internal properties, then the definitions of the system group "Stuggart" are overridden in case the tables of the process models of "Loan" and "TravelExpense" are affected.
- Definitions for the "Loan" process specify that the audit trail should be managed in "Node1" and the processes tables in "Node2" (lines 3 and 4). Whenever the workflow systems works with an instance of the "loan" process, it will set the appropriate column value in the audit trail table to "Node1", and the appropriate column in the tables associated with processes to "Node2". In essence these definitions instruct the WFMS to assign a specified value, namely "Node1" and "Node2", explicitly to the partitioning key. Similar definitions are required with respect to the database management system for the creation if the corresponding database tables. Certainly the workflow system cold generate the appropriate tables automatically.
- Similar entries for the "Travel Expense" process are reflected in lines 8 and 9 of above example.

The set-up the workflow system and the database management system could require additional user actions as explained in the following.

The user could provide a special hash mechanism if the database system supplied hash mechanism(s) are not appropriate. A random hash mechanism would not help for example of one wants to use the creation data and partition the tables by create date time frames. For such purposes an additional definition construct can be introduced (not shown in above figures) allowing an user to specify a hashing functions, which allows a database management system to map the various ranges of the partitioning key values onto partition numbers.

The user may need to define how the workflow system connects to the database system. One option is to have all systems connect to one node and have this node hold all built-time information and have the run-time information split across the other nodes. Another option is to attach each system to the node that holds most of the data, an approach that is particularly useful when using the system identifier as partitioning key.

Figure 4:
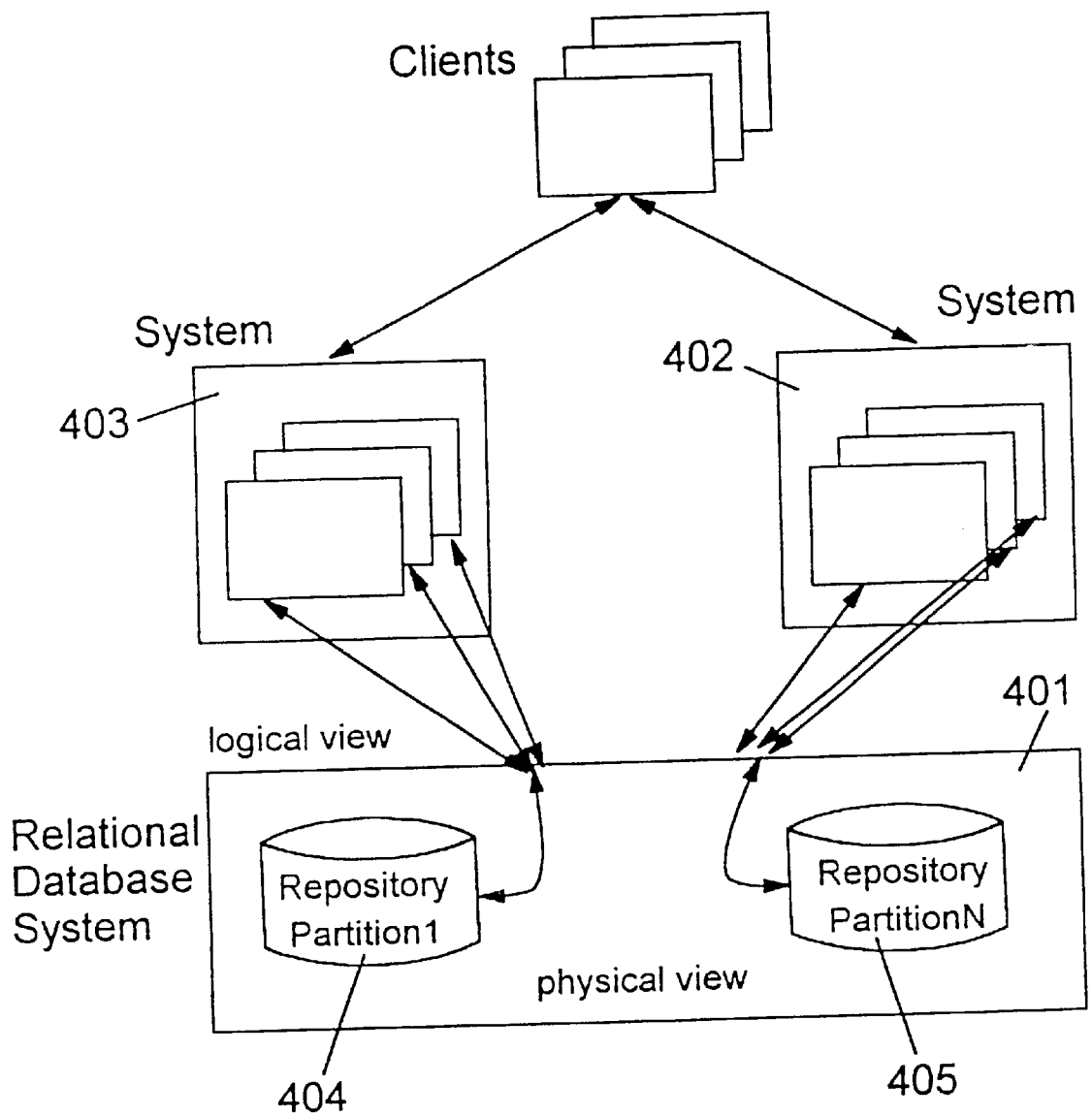
FIG. 4 summarizes a WFMS according the current invention, which stores parts of the tables building the system repository in a parallel database offering the logical view of a single database management system with respect to the various WFMS instances. Exploiting inter-parallel database technology the parallelized parts of the system repository actually are stored in physically different partitions providing a maximum of parallelism, concurrency and availability.

FIG. 4 depicts a summarizing view on WFMSs with parallel database support according the current invention. In contrary to FIG. 1 the WFSM according this teaching stores parts of the tables building the system repository in a parallel database offering the logical view of a single (401) database management system with respect to the various WFMS instances (401, 403). Exploiting inter-parallel database technology the parallelized parts (404, 405) of the system repository actually are stored in physically different partitions providing a maximum of parallelism, concurrency and availability.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A Workflow-Management-System (WFMS) for supporting maintenance of a system-repository associated with the WFMS in a plurality of parallel databases by a Database-Management-System (DBMS), the WFMS comprising one or more WFMS instances executed on one or more computer systems coupled to the DBMS, the WFMS comprising:

at least one table comprising the system-repository, each table including a sequence of attributes and a plurality of records each with a sequence of attribute-values for the sequence of attributes;

a WFMS definition-means for specifying at least one attribute as a partitioning-key for each table to enable partitioning of each table into the plurality of parallel databases on the basis of a particular partitioning-key and to enable the DBMS to maintain and provide parallel database access to records associated with the particular partitioning-key in a parallel database, wherein parallel and concurrent access by the WFMS instances to the system repository is enabled.

2. The WFMS according to claim 1, wherein the parallel database is an inter-partition-parallel-relational-database.

3. The WFMS according to claim 1, wherein the definition-means specifies a system identification of each WFMS instance as the partitioning-key.

4. The WFMS according to a claim 1, wherein the definition-means specifies a creation time associated with creation of the records as the partitioning-key.

5. The WFMS according to claim 1, wherein the definition-means supports assignment of a particular value to the partitioning-key.

6. The WFMS according to claim 1, wherein the definition-means further specifies a hash-function used by the DBMS to map at least one attribute-value of the at least one attribute of said partitioning-key to a set of partitioning-key-values.

7. The WFMS according to claim 1, wherein the definition-means specifies a partitioning-key for partitioning at least one table that comprises a process-model associated with the WFMS; execution instances of the process-model; an audit-trail of the process-model; or work items related to the execution instances of the process-model.

8. The WFMS according to claim 1, wherein the WFMS utilizes at least one attribute-value of the at least one attribute of the partitioning-key in a WHERE clause of an SQL access to the parallel database.

9. The WFMS according to claim 1, wherein the WFMS further comprises at least one process model that includes the WFMS definition-means.

* * * * *

UNITED STATES PATENT AND TRADEMARK OFFICE
CERTIFICATE OF CORRECTION

PATENT NO. : 6,415,297 B1
DATED : July 2, 2002
INVENTOR(S) : Frank Leyman et al.

It is certified that error appears in the above-identified patent and that said Letters Patent is hereby corrected as shown below:

<u>Title page,</u>
Item [57], ABSTRACT, line 1, delete "The invention suggests" and insert -- The present invention relates to --

<u>Column 14,</u>
Line 28, "NQDE2" should read -- NODE2 --

Signed and Sealed this

Seventeenth Day of June, 2003

JAMES E. ROGAN
*Director of the United States Patent and Trademark Office*